United States Patent [19]

Tuhro

[11] Patent Number: 4,724,330
[45] Date of Patent: Feb. 9, 1988

[54] SELF ALIGNING RASTER INPUT SCANNER
[75] Inventor: Richard H. Tuhro, Webster, N.Y.
[73] Assignee: Xerox Corporation, Stamford, Conn.
[21] Appl. No.: 910,713
[22] Filed: Sep. 24, 1986
[51] Int. Cl.$^4$ ............................................. H01J 40/14
[52] U.S. Cl. .................................... 250/578; 358/293; 358/294
[58] Field of Search ............... 250/578, 211 R, 211 T; 358/293, 294

[56] References Cited

U.S. PATENT DOCUMENTS

| | | | |
|---|---|---|---|
| 4,149,091 | 4/1979 | Crean et al. | 250/566 |
| 4,314,159 | 2/1982 | Davis | 358/293 |
| 4,358,794 | 11/1982 | Kurakami et al. | 250/578 |
| 4,459,619 | 7/1984 | Yoshida | 358/294 |
| 4,465,939 | 8/1984 | Tamura | 358/294 |
| 4,675,745 | 1/1987 | Suzuki | 358/294 |

OTHER PUBLICATIONS

Xerox Disclosure Journal; "Raster Scanner Alignment Technique"; M. A. Agulnek; vol. 5, No. 3, May/Jun. 1980; pp. 301–302.

Primary Examiner—David C. Nelms
Assistant Examiner—Chung Seo

[57] ABSTRACT

A system for calibrating a raster input scanning device for detecting an image on a preselected surface, including a linear photoelectric sensor array comprising a plurality of discrete photosensitive elements arranged along a first axis, for sensing and generating electrical representations of an image on a surface; a carriage assembly movable along a second axis, transverse to said first axis; and supporting a sensor detectable target image for movement along the second axis. The sensor detectable target image includes an alignment feature for use during alignment operations. A drive system moves the carriage assembly carrying the target image from a starting position along said second axis, and the distance traveled by the carriage assembly from said starting point until the alignment feature on said target image is sensed is measured. A y-axis comparator compares the measured distance with a y-axis reference to determine an y-axis offset value which is stored in a y-axis memory as an y-axis offset value. Magnification and focus calibration are provided in similar fashion.

14 Claims, 4 Drawing Figures

SELF ALIGNING RASTER INPUT SCANNER

This invention relates to raster input scanners and, more particularly, to raster input scanners that provide self alignment of the x-and y-scanning axes.

BACKGROUND OF THE INVENTION

Raster input scanning technology has progressed rapidly in recent years, particularly in data entry applications. With the scanning arrays longer, and comprised of greater numbers of photosites than ever before requiring only a single array to read the sagittal (x axis or fast scan direction) of the document, scanning speeds have greatly increased. The entry of data to data processing systems through raster input scanning devices has become an attractive goal.

While data processing and scanning arrays have become substantially less expensive, the exacting mechanical alignment required for the scanning arrays and optics remains a significant cost factor in the construction of raster input scanning devices. Without exact mechanical positioning of the scanning arrays with respect to the optical system and input information handling devices, the scanner is inexact, and data errors may result. While a well constructed device may be aligned to within a few tenths of a percent of the desired position, a careless alignment will cause significant problems. As an example, a photosite array housing and support may require several adjustments, including adjustments to slow scan (y-axis) and fast scan direction, tilt, magnification, focus and height requiring separate parts adjustable in each direction. Even with excellent factory quality controls, disturbance in the field may ruin a careful factory alignment. A self aligning device operative to avoid certain of these mechanical adjustments would improve this problem significantly.

U.S. Pat. No. 4,149,091, assigned to the same assignee as the present invention, and incorporated herein by reference, describes a system for aligning a plurality of offset and overlapping arrays by measuring and storing information in a device memory regarding the array positions with respect to each other, and using the stored information as offset values in processing the data entered into a processing system through the raster input scanner. The information regarding the position of the sensor arrays necessary for this system is acquired by microscopically measuring the arrays and storing the information in a memory as a vernier scale which tells the scanning device when to switch from array to array.

The Xerox Disclosure Journal "Raster Scanner Alignment Techniques", Vol. 5, No. 3 (May/June 1980) appears to show an calibration method for determining offsets required to correct misalignment. The y-axis is adjusted by choosing the array offsets along the y-axis, and the x-axis is adjusted by choosing the bit offsets along the x-axis. The primary thrust of the discussion relates to the provision of a particular type of test document for improved calibration use.

Japanese Patent Document No. 59-63873 provides a picture input device in which a rotary encoder integrally mounted with the line sensor is used as a range finder whereby for each movement of the line sensor a predetermined distance a pulse is directed to a controller.

SUMMARY OF THE INVENTION

It is therefore a principal object of the present invention to provide an alignment system for the self alignment of the x- and y-scanning axes, focus and/or magnification in a raster input scanning device.

It is another object of the invention to provide a raster scanner which stores in memory internal reference values from which other image measurements and manipulations may be made.

It is yet another object of the present invention to provide a method of aligning the electronic and mechanical components of a raster input scanner, without the requirement of mechanical manipulation of the components.

In accordance with the objects of the present invention, there is provided a method and apparatus for self alignment of a raster input scanner. An image scanning device is provided with a linear photoelectric sensor array for detecting image information on a preselected surface, the array comprising a plurality of discrete photosensitive elements arranged along a first axis for sensing and generating electrical representations of the image information on a surface; a carriage assembly movable along a second axis, transverse to said first axis, and supporting a sensor detectable calibration target for movement therealong; a drive system for driving the carriage assembly from a starting position along the second axis; measuring means for measuring the distance traveled by the carriage from the starting position until a selected alignment feature on the calibration target is sensed; and a y-axis memory means for storing a value indicative of said measured distance for use as a y-axis offset value. In operation, the carriage assembly carrying a calibration target is moved along the second axis from a preselected position. The sensors in the array detect a particular feature of the target, whereupon the distance traveled by the carriage from the starting point along the y-axis until the sensors detect the selected feature on the calibration target is measured. This distance may be compared to a stored theoretical or reference value representing the distance from the home position that the feature should be located, based on known dimensions of the aperture card, calibration target, and selected feature. The comparison between the theoretical value and the measured value is stored in a memory for use by image processing systems as a y-axis offset value.

In accordance with another aspect of the present invention, an x-axis offset value is derived by sensing a selected feature on the calibration target, and determining its position with respect to the linear sensor array. This position may then be compared to a reference value stored in a device memory and the results used as an x-axis offset by the imaging processing system. Alternatively, an offset value may be derived for either or both axes using a similar procedure.

In accordance with yet another aspect of the invention, a magnification offset value is derived by comparing the position a selected, detected feature with a desired position for the feature, determining a magnification ratio based on the comparison and storing that value as a magnification offset value.

In accordance with still another aspect of the invention, a focus offset value may be provided by sensing a target for a selected focusing feature, determining the best focus by moving a lens with respect to the target, and storing the best focus position as a focus offset value.

The above described invention provides the advantage of reducing substantially the requirements of mechanical alignment. By providing alignment electronically, alignment operations can be reduced to fitting the photosite array housing and support as a single unitary member, reducing the cost of manufacture, and eliminating further adjustment requirements.

With offset values determined electronically, the values may be used in a number of ways. Thus, for example, the raster input scanner can ignore or discard information from scanned area on the aperture card film surface between the mechanical origin or starting point in the y-direction, and the point at which the calibration process has determined the image information on the film held in the aperture card should begin. In a like manner, in the x direction, an excess number of photosites on either end of the photosite array can be discarded or ignored. The raster input scanner "reads" only that portion of the subsequent image information on the aperture card film presented for entry to the data processing falling within a window determined to represent a centered image. Thus, the image information is centered with respect to the system. As a diagnostic tool, by reviewing the programmed alignment, large scale defects may be remedied, such as when either the x- or y-axis discards too great a portion of the image field. The stored magnification and focus values aid in allowing a return of the machine to nominal operating values after the occurrence of a disturbing condition, repair, movement of the device, etc. In the case of magnification, the stored magnification information enables certain interpolation routines used to provide a magnification of the information detected on the original scanned.

The arrangement also provides information to the control electronics for processing detected image information by providing the appropriate electronic information such as x- and y-offset values for such further image handling requirements as cropping or windowing, and scaling or magnification.

Other objects and advantages of the invention will become apparent from the following description and drawings in which.

Figure 1:
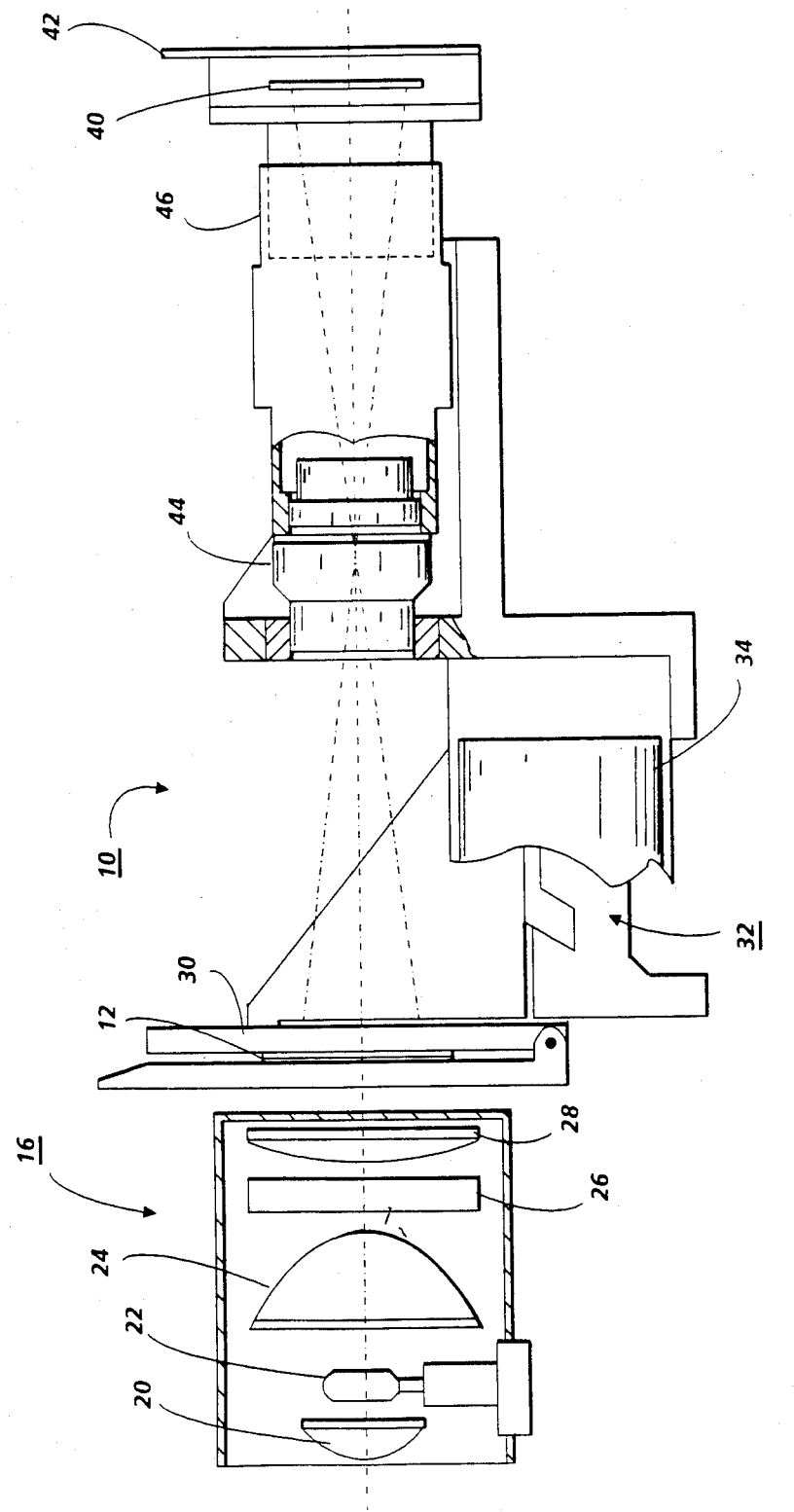
FIG. 1 is a somewhat schematic view of a raster input scanner for scanning a transmissive original, of the type contemplated to incorporate the present invention.

Referring now to the drawings, wherein the showings are for the purpose of illustrating a preferred embodiment of the invention and not for the purpose of limiting same, FIG. 1 shows, somewhat schematically, an arrangement for a raster input scanner 10 of the type contemplated to incorporate the present invention and adapted for scanning image information from a transmissive original, such as an aperture card 12 with sensor array 40. Raster input scanner 10 is of a type well known in the art. A raster input scanner of the type contemplated may be generally comprised of light source 16, comprised of reflector 20, lamp 22, condenser 24, filter 26 and lens 28, for illuminating image information printed on high quality photographic film and held in aperture card 12. Aperture card 12 is held in position for scanning by card holder 30. Card holder 30 is mounted on slide 32 for reciprocal movement in a horizontal direction along the y-axis, which in FIG. 1 is perpendicular to the plane of the drawing. A drive motor 34 imparts motion to the card holder 30 via precision lead screw drive 36 (best seen schematically in FIG. 2), whereby card holder 30 is moved along slide 32 carrying aperture card 12 therewith. Movement along slide 32 comprises motion in the slow scan y direction, indicated by the arrow 37.

Figure 2:
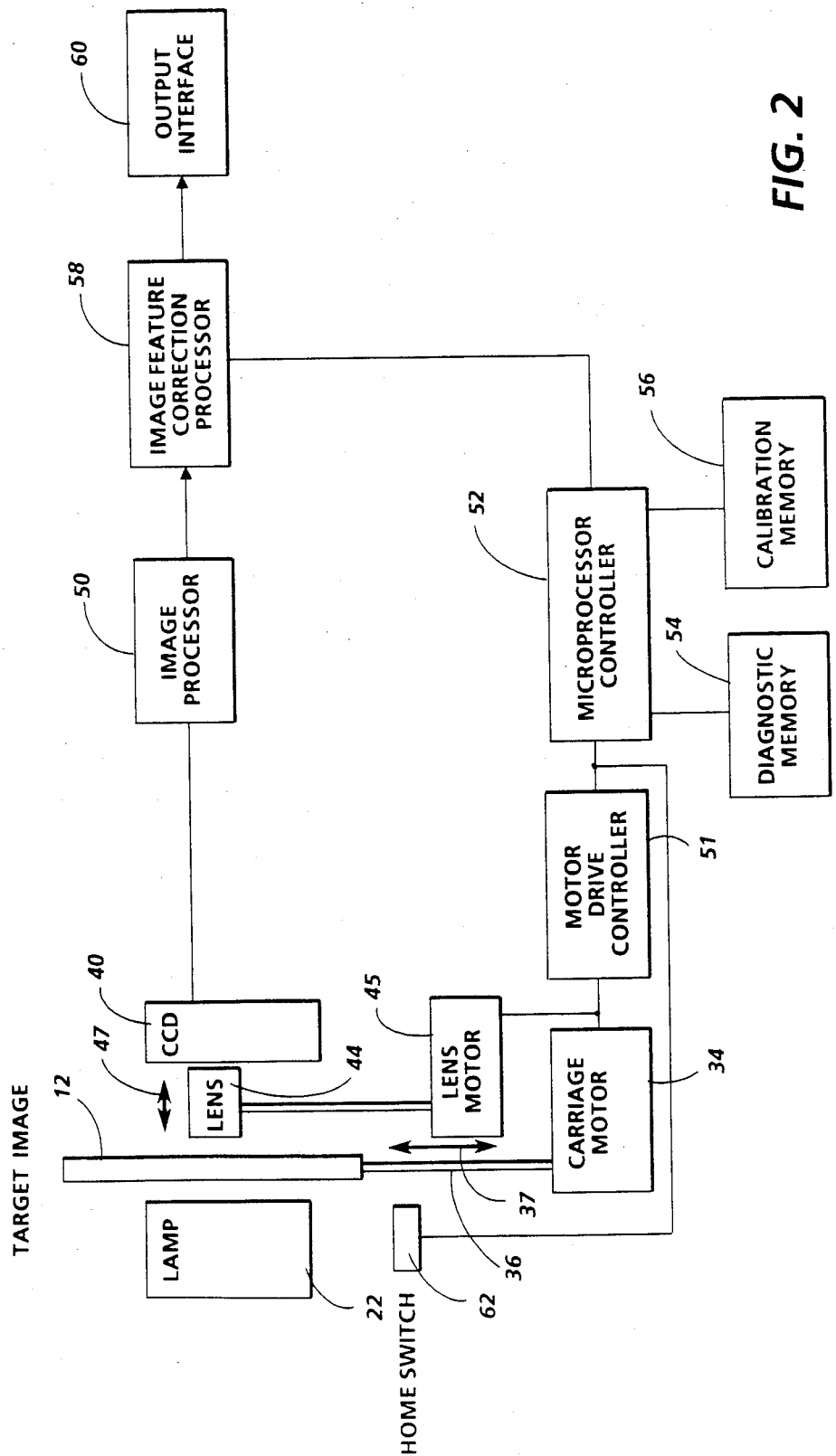
FIG. 2 is a block diagram demonstrating the operational elements of a preferred embodiment of the present invention.

The image formed by light passing through the film held by aperture card 12 is focused on sensor 40 mounted on sensor board 42, through lens 44. As shown in FIG. 2, lens 28 may also be supported for movement along a slide (not shown) towards and away from sensor array 40, as indicated by arrow 47, driven by lens motor 38 via precision lead screw drive 39 to allow focusing of the optical arrangement. Magnification of the image may be possible with magnification adjustment 46, in addition to or if electronic magnification adjustment is not provided. Sensor 40, as contemplated in the present invention, may be comprised of a linear array of photosites extending in the x (fast scan) direction (best shown in FIG. 4) such as, for example, CCD's which detect light striking the sensor array through the image information on the film held in aperture card 12. In a preferred embodiment, the length of the sensor array 40 may correspond to the x direction length of the film held in aperture card 12 providing a 1:1 correspondence in size between the image information on the film in aperture card 12 and the image focused on sensor array 40, and may be comprised of about approximately 5900 discrete photosites. It will be appreciated as an alternative that the described array may be smaller or larger than the image information on the film in aperture card 12, in which case the image may be magnified to be commensurate with the length of the array. As yet another alternative, the sensor may be a two dimensional array, extending in both x and y directions. In such an arrangement, the sensor detects the image of a selected two dimensional area. The two dimensional sensor may be large enough, i.e. provide satisfactory resolution to provide sensing of the entire image area simultaneously, or require movement of the image with respect to the array to derive a series of images. The photosites are "exposed" to light from the image in preset time increments or integration periods during which a charge proportional to the light detected from a narrow bit of a slice of the image projected on array 40 is generated at each photosite. Following integration, the charges derived at the photosites are moved to image processor 50 for data manipulation and output.

Referring to FIG. 2, carriage motor 34 may advantageously be a stepping motor controlled by motor drive controller 51 with a technique called microstepping provided to allow the motor revolutions to be divided into a large number of steps, each step providing an exact increment of linear movement of lead screw 36, and accordingly aperture card 12. Accordingly, the image is advanced across the array 40 incrementally, step-by-step as motor drive controller 51 delivers control pulses to the motor in accordance with operation of the device. A D.C. motor may also be used, coupled with an encoder arrangement providing a signal indicative of the position of the lens or carriage, based on operation of the motor. Similarly, lens motor 38 may advantageously be a stepper motor or a D.C. motor suitable for controllably driving the lens towards and away from the sensor array 40, controlled in a similar manner by motor drive controller 51. Movement of the lens thereby varies the focus of the device.

Microprocessor controller 52 controls the sequence of events in the raster input terminal. This electronic controller is comprised of a suitable CPU chip such as an Intel Model 8085 CPU chip manufactured by Intel Corporation. The CPU is provided with a diagnostic memory means 54 storing necessary calibration information, such as the characteristic features of the calibration images to be detected and theoretical or reference locations of particular selected features on the calibration target, i.e. where in a perfectly aligned arrangement the features should be detected, and a nonvolatile RAM calibration memory 56 to receive the information acquired or derived during the calibration procedure for storage and subsequent use by microprocessor controller 52 during normal data input operations. The use of a volatile RAM calibration memory, while satisfactory for operation of the device, will require recalibration of the device each time the machine is powered up.

In operation, light from lamp 22 passes through the photographic film contained within aperture card 12, creating an image of whatever is disposed on the film for detection by CCD array 40. CCD array 40 is exposed to a sequence of narrow slices of the image, each for a preselected integration period, during which time charges of energy are created at the photosites comprising the array. The charges are passed to image processor 50 where analog values derived by the sensors are converted to digital signals suitable for use by standard microprocessors. The digital signal is subsequently passed to an image feature correction processor 58 which utilizes information from microprocessor controller 52 to correct the image by centering, magnifying, cropping, scaling, etc in accordance with operating characteristics or user selectable features of the raster input scanner, as programmed or selected through microprocessor controller 52. The processed signal is then sent to output 60 from where the signal may be sent to appropriate data utilization devices, such as printers, telecommunication devices, computer workstations, etc. The above described arrangement is well known in the art, and does not form a part of the present invention.

Figure 3:
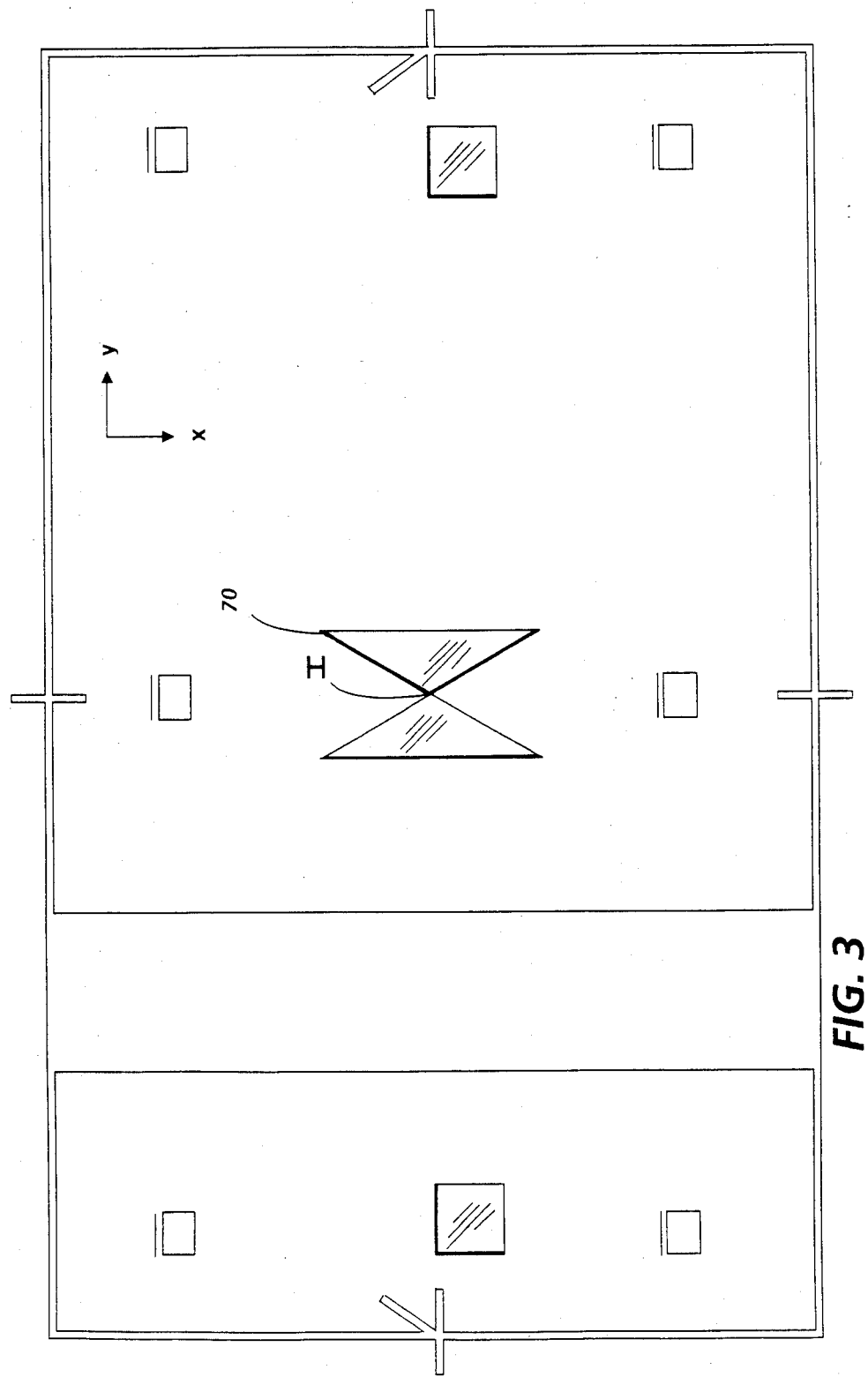
FIG. 3 shows a calibration target including alignment features in accordance with a preferred embodiment of the invention.

As shown in FIG. 3 and in accordance with the invention, the film contained within aperture card 12 is provided with a calibration target 62. In a preferred embodiment, calibration target 62 may be comprised of several vertical, horizontal and skewed lines, and a variety of geometric shapes useful for calibration of adjustable features of the system, including a butterfly shape 70 comprised of two generally similar triangular shapes having apexes joined at a point centrally located proximate to the center of target and film, and having the apexes oriented and pointing along a line parallel to the axis of travel (y-axis) of the calibration target. It will be appreciated that the calibration target as shown in FIG. 3 is but one possible embodiment. Almost any arrangement providing distinguishable and detectable features would be suitable for use.

Referring to FIGS. 2 and 3, card carriage 32 is moved to a mechanical home position as a starting point. When home switch 62 is enabled by the presence of the card carriage at the home position, a counter in microprocessor controller 52 is set to a zero point or origin. When calibration of the device is required, the slow scan drive is enabled and the carriage 30 supporting the calibration target 62 is driven along the y-axis across the field of view of the sensor array 40 by motor 34 via lead screw drive 36. The pulses required to drive the motor 34 increment the microprocessor counter, as indications of movement and thus, measurement of movement along the y-axis. The image information-supporting film is moved across the field of vision of the photodetector array 40, which detects image information thereon, transmitting the signals derived at the array 40 to image processor 50. Image processor 50 forwards the information derived at the photosites to microprocessor controller 52 for comparison to stored calibration information in diagnostic memory 54. In the present embodiment, the y-axis calibration point is the point I at which the apexes of the butterfly shape 70 meet. On a positive comparison with the information stored in diagnostic memory 54, whereby detection of the feature is determined, the number of pulses from the motor drive controller 51 counted by microprocessor controller 52 is compared to a reference value stored in diagnostic memory 52, and the comparison, indicative of the distance difference along the y-axis between the sensed position of the feature and the reference value representing a desired or theoretical position of the feature is stored as an offset value at calibration memory 56. Knowledge of the difference between reference value and sensed value enables the microprocessor controller 52 to determine the actual starting point of the image information on aperture card 12. Thus the offset allows the processor to ignore or discard excess data received during y-axis scanning as determined by the y-axis offset value.

In a similar manner, a focus offset value may be derived and stored. A selected feature is detected, chosen from the calibration target 62, such as the butterfly feature 70. The calibration target 62 is scanned in the same manner as described with respect to the y-axis offset value determination until this feature is found by a process of comparison to stored information at diagnostic memory 54. At this point the features are compared with memory to determine whether the detected image occludes an appropriate number of sensors. Focus is a function of obtaining the greatest intensity of the image over the minimum number of sensors. To determine whether the device is at a best focus position, the lens motor, initially placed at a known mechanical home position, incrementally drives the lens either closer to or further away from the target image. A sensing routine detects the intensity and number of pixels occluded at each incremental position until a best value is found. Microprocessor controller 52 stores the position the lens of the best focus value detected until a better focus is detected at a new lens position. The best focus position is stored in the calibration memory 56 as the focus offset value. Thereafter, during a calibration routine, the lens may be moved form the mechanical home position to the best focus position, as part of the alignment process.

Figure 4:
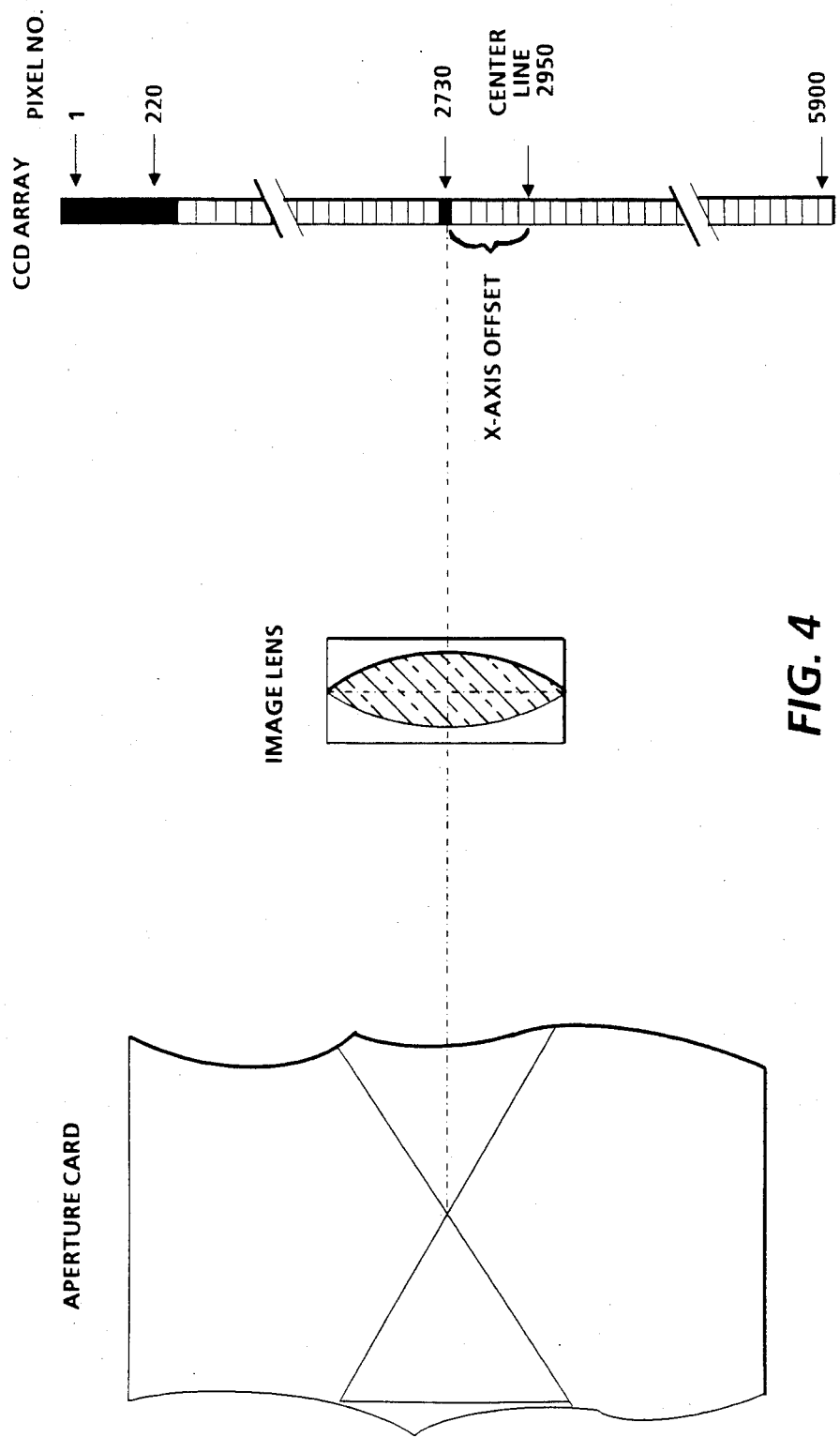
FIG. 4 graphically illustrates the x direction alignment, and magnification adjustment.

To determine the x-axis offset value, a selected feature is chosen from the calibration target 62 from which an x-axis offset value will be determined. In a preferred embodiment of the invention, the selected feature may again be the point I at which the apexes of the triangles forming butterfly shape 70 are joined. The calibration target 62 is scanned in the same manner as described with respect to the y-axis offset value determination until this feature is found by a process of comparison to the stored information at diagnostic memory 54. When the point I is found by the scanning process, its position with respect to the array of photosites is measured. For example, as shown in FIG. 4, the point I is detected by the sensor array 40. The feature may be detected by identifiable discrete photosensors, e.g. photosite sensor element 2730. By comparing the position of the photosites at which the feature is actually sensed to an x-axis reference stored in diagnostic memory 54, indicative of the position of the photosites sensor where the value should have been sensed, e.g. photosite sensor element 2950, it can be seen that the point I is displaced from its desired position by a distance corresponding to about approximately 220 photosites. In accordance with this determination, it may be appreciated that an x-axis offset value may be entered into the calibration memory which effectively discards or ignores the data received from photosites 1 to 220 on the array in this manner, the x-axis is effectively centered with respect to the sensor array 40 since identical amounts of data on either side of the centerline 2950 will be measured.

As an alternative method of detecting the x-axis offset value, and in accordance with the present invention, a line extending along the x-axis may be sensed, and its position measured with respect to the ends of the array. Thus, if a line has a known length which would be detected by a a selected number of photosites, the position of the end points of the line with respect to the endpoints of the array may be compared with stored values for the same distances. Accordingly, detecting a greater value for these distances than that stored in the diagnostic memory 54 would require the discarding of the data from the excess photosites, which is stored in the calibration memory for use by the microprocessor controller 52. Magnification is also determinable from this information. A feature is detected as described, and a comparison is made between the detected position and the desired position. Based on this comparison, a number of desired data points is determined. If the number of desired data points is greater that the number of photosites available, an interpolation routine is used to create a large number of data points, according to a "nearest neighbor" or an average of adjacent points. This new data will be the output image data. The number of points derived from the comparison of the detected value with the desired value may be stored a magnification offset, which will serve to provide desired magnification whenever the device is used. For example, if a selected feature such the point I is detected by 10 photosites, but desired to be detected by 12 photosites, a value stored in diagnostic memory 54, a magnification flaw is determined. The device will store a magnification offset ratio of 1:1.2, a ratio corresponding to the desired magnification offset. in calibration memory 56. Then, the device will perform an interpolation routine for every operation to produce the required 600 more data points. In a typical interpolation routine, this would include generating data for a multiple of the actual (detected) data points, and selecting a number of this multiple corresponding to the desired final number of data points. Thus, the desired number of data points would be provided.

It will be appreciated that while the present invention is described with respect to use in an arrangement suitable for scanning image information on aperture cards, the invention would find use in almost any raster scanning input device. Accordingly, in a device for scanning image information on the surface of an opaque sheet of paper or other substrate, the calibration target could be supplied in a suitable format, e.g. an opaque substrate suitable for scanning by the chosen device, or permanently embedded on the platen or platen cover. The remainder of the device would remain substantially the same using the scanning and data handling arrangements existing in such device. It will also be understood that the present invention, as described hereinabove could be readily modified to provide a moving scanning array arrangement and a fixed image support surface. It will also be appreciated that the sensor array could easily comprise a two dimensional array having sensors extending in both x- and y-directions. In such a case, there may be no requirement to provide the carriage motor and y-axis alignment procedure, as both directions could be aligned with the x-axis procedure applied to both axes.

The invention has been described with reference to a preferred embodiment. Obviously, modifications will occur to others upon reading and understanding the specification taken together with the drawings. The described embodiments are only examples, and various alternatives, modifications, variations or improvements may be made by those skilled in the art from this teaching which are intended to be encompassed by the following claims.

I claim:
1. A system for calibrating a raster input scanning device for detecting an image on a preselected surface said system including:
   a linear photoelectric sensor array comprising a plurality of discrete photosensitive elements arranged along a first axis for sensing an image on a surface and generating electrical representations thereof;
   a carriage assembly movable along a second axis, transverse to said first axis, and supporting a sensor detectable target image for movement therewith, said sensor detectable target image including a preselected alignment feature for use during alignment operations;
   a drive for driving said carriage assembly from a starting position along said second axis;
   second axis measuring means for measuring the distance traveled by said carriage from said starting position until said preselected alignment feature on said target image is sensed by said linear photoelectric sensor array;
   second axis comparison means for comparing said measured distance from said starting position along said second axis, with a second axis reference to determine an second axis offset value; and
   a second axis memory for storing said second axis offset value.

2. The system as defined in claim 1, wherein said sensor detectable test target is removable from said carriage.

3. The system as defined in claim 1, including first axis measurement means for detecting a position of said selected alignment feature with respect to said linear photoelectric sensor array, first axis comparison means for comparing said selected alignment feature detected position with an first axis reference to determine an first axis offset value; and first axis memory means for storing said first axis offset value.

4. The system as defined in claim 3, wherein said sensor detectable test target is removable from said carriage.

5. A method of calibrating an raster input scanning device for detecting an image on a preselected surface, including the steps of:
providing a linear array of photosensitive sensors arranged along a first axis for sensing and generating an electrical representation of an image;
moving a sensor readable test target along a second axis, transverse to said first axis, from a predetermined starting point, said sensor readable test target including at least one selected alignment feature;
measuring the distance traveled along said second axis by said target from said starting point until said sensors detect said selected alignment feature;
comparing said measured distance with a second axis reference value;
storing a second axis value representative of said comparison in a device storage memory; and
using said stored second axis value as a second axis offset reference.

6. The method as described in claim 5 and including:
sensing a selected alignment feature with said array of photosensitive sensors;
determining the location of said feature with respect to said array of photosensitive sensors;
comparing said sensed location with an first axis reference;
storing an first axis value representative of said comparison in said device storage memory;
using said stored first axis value as an first axis offset reference.

7. In an apparatus for scanning an image in a line by line fashion to produce data representative of the image scanned, including
a linear scanning array comprised of a plurality of discrete photoelectric sensors arranged along a first axis for detecting images on a preselected surface; and means for moving at least one of a surface to be scanned and said scanning array relative to the other along a second axis transverse to said first axis, starting from a predetermined start position;
a sensor detectable target image removably mountable on said surface to be scanned;
second axis measuring means for determining the distance traveled by said at least one of a surface to be scanned and said scanning array relative to the other along said second axis from said predetermined starting position until a selected feature on said target image is detected;
second axis comparison means for comparing said distance with a reference to derive a second axis offset value; and
a memory storing said second axis offset value.

8. The improvement as defined in claim 7, and including:
sensing a selected feature on said target image;
first axis measuring means for detecting the position of said selected feature with respect to said array;
first axis comparison means for comparing said position with a reference to derive a first axis offset value; and
a memory storing said first axis offset value.

9. In an apparatus for scanning an image to produce data representative of the image thus scanned, including:
a scanning array comprised of a plurality of discrete photoelectric sensors arranged along at least a first axis for radiation indicative of images on a preselected surface;
a sensor detectable target image supported for detection by said sensors;
a controller for detecting the position of a selected and detected feature on said target image with respect to a selected axis on said scanning array;
a comparator for comparing said position with a reference to derive a axis offset value; and
a memory storing said axis offset value.

10. A system for calibrating a raster input scanning device, including:
a linear photoelectric sensor array comprising a plurality of discrete photosensitive elements arranged along a first axis, for sensing and generating electrical representations of an image on a surface;
a carriage assembly movable along a second axis, transverse to said first axis, and supporting a photoelectric sensor detectable target image having selected alignment features;
a drive system for driving said carriage assembly from a starting position along said second axis;
a motor drive controller producing a series of control signals for controlling said drive system;
a diagnostic memory for storing reference information representative of a selected alignment feature and a desired location thereof;
a system controller for comparing images detected by said photosensitive elements with said stored reference information to identify the detection of a selected alignment feature by said photosensitive elements, receiving said control signals from said motor drive controller as indications of distance traveled by said carriage assembly along said second axis and comparing said distance traveled by said carriage with said desired location of said alignment feature; and
a calibration memory for storing a y-axis offset value from said system controller derived by comparing said distance traveled by said carriage assembly along said second axis until said photosensitive elements detect a a selected feature on said target image, with the desired locations of a selected feature for use as a y-axis offset value.

11. The system as defined in claim 10, wherein said system controller compares the position in the sensor array of photosensitive elements detecting said selected feature with a desired position in said sensor array for said selected feature stored in said diagnostic memory, and stores the difference between said positions as an x-axis offset value.

12. A system for calibrating a raster input scanning device, including:
a linear photoelectric sensor array comprising a plurality of discrete photosensitive elements arranged along a first axis, for sensing and generating electrical representations of an image on a surface;
means for moving at least one of said image and said sensor array relative to the other along a second axis, transverse to said first axis;
measuring means for measuring the relative movement of said image and said sensor array; and means for identifying a selected feature on said image; and means for determining the positional difference between said identified selected feature and a reference position.

13. A system for calibrating magnification in a raster input scanning device including:
- a linear photoelectric sensor array comprising a plurality of discrete photosensitive elements arranged along at least a first axis, for sensing and generating electrical representations of an image on a surface;
- a sensor detectable target image supported for detection by said sensors and including a selected magnification feature;
- a controller for determining the number of photosensitive elements detecting said selected magnification feature;
- a comparator for comparing the actual number of photosensitve elements detecting said selected magnification feature with a reference value and determining a magnification constant;
- a memory for storing the magnification constant.

14. A system for calibrating focus in a raster input scanning device including:
- a linear photoelectric sensor array comprising a plurality of discrete photosensitive elementsh arranged along at least a first axis, for sensing and generating electrical representations of an image on a surface;
- a sensor detectable target image supported for detection by said sensors and including a selected focus feature;
- a light source for illuminating said target image;
- a focusing lens for focusing light from said target image, sensor array, arranged between said sensor array and said target image, said lens controllably movable therebetween to vary focus of the light rays.
- a controller for determining the number of sensors detecting said selected focus feature, and the intensity of light from said detected feature as an indication of focus at any selected position;
- a temporary memory for storing focus indications at successive selected positions of said focusing lens between said sensor array and said target image; and
- a calibration memory for storing the selected position of said focusing lens deriving the optimum focus indication.

* * * * *